United States Patent [19]
Engel et al.

[11] Patent Number: 5,967,169
[45] Date of Patent: Oct. 19, 1999

[54] AIR INTAKE FOR ENGINES

[75] Inventors: Herbert Engel, Bruckmühl; Hubert Broll, Neubiberg; Hermann-L. Weinreich, Ottobrunn, all of Germany

[73] Assignee: DaimlerChrysler AG, München, Germany

[21] Appl. No.: 08/984,265

[22] Filed: Dec. 3, 1997

[30] Foreign Application Priority Data

Dec. 11, 1996 [DE] Germany .................... 196 51 491

[51] Int. Cl.⁶ .................................................... B64D 33/02
[52] U.S. Cl. .......................................... 137/15.1; 137/15.2
[58] Field of Search .................... 137/15.1, 15.2

[56] References Cited

U.S. PATENT DOCUMENTS 3,659,424  5/1972  Polk, Jr. .
4,307,743  12/1981 Dunn .
5,337,975  8/1994  Peinemann .
5,697,394  12/1997 Smith et al. .......................... 137/15.1

FOREIGN PATENT DOCUMENTS 0 646 525 A1  4/1995  European Pat. Off. .

Primary Examiner—Gerald A. Michalsky
Attorney, Agent, or Firm—McGlew and Tuttle, P.C.

[57] ABSTRACT

The air intake for air-breathing engines for supersonic flight velocities, especially ram jet engines and ram rocket engines of missiles, with an essentially rectangular intake contour, has a closing flap covering the said intake contour and an actuating mechanism. The closing flap has a one-piece design and is adapted to the intake contour such that it completely covers the air intake in its closed position, so that all peripheral scarved front edges are covered and thereby protected against erosion as well as against the penetration of foreign bodies.

20 Claims, 5 Drawing Sheets

(A-A)

(B-B)

AIR INTAKE FOR ENGINES

FIELD OF THE INVENTION

The present invention pertains to an air intake for engines, especially ram jet engines and ram rocket engines of missiles, which are carried primarily by carrier planes and are started from same (or which are started from the ground), with an essentially rectangular intake contour, with a boundary layer air discharge channel, with an inner closing flap covering the intake contour, and with an actuating mechanism for opening the inlet cross section of the intake and the boundary layer air discharge channel.

BACKGROUND OF THE INVENTION

Various engines whose intakes are provided with closing flaps have been known. For example, the Applicant's of DE-PS 42 35 631 describe a cross section-controlled rectangular air intake, in which a pivotable adjusting ramp, which makes it possible to greatly vary the inlet cross section and consequently the air throughput, is located in the lower part of the intake between plane-parallel side walls. A diffuser part located between the adjusting ramp and an upper, fixed shock wave ramp makes it possible to absorb the inlet head wave in the case of a small internal cross section contraction and consequently to build up an internal supersonic compression. The lower closure of the flow is guaranteed by an auxiliary flap, which extends under the adjusting ramp to a connection web arranged between the side walls. This air intake makes it possible to achieve a low-resistance throughput control at the lowest possible external resistance for the entire range of Mach numbers.

The external and internal geometry of the air intake not only for engines of airplanes but also for engines of missiles is set by the operating conditions. It is, in general, absolutely necessary, especially in the case of missiles started from the air, to close the air inlet before the start of the engine by displaceable parts of the air intake or by closing flaps.

SUMMARY AND OBJECTS OF THE INVENTION

The primary object of the present invention is to provide an air intake with a closing flap and with an actuating mechanism opening the closing flap, with which diffuser boom during the supersonic carried flight and boost flight as well as the penetration of foreign bodies is prevented, and the sensitive front edges of the intake are extensively protected against erosion during carried flight as well as against denting due to incorrect treatment on the ground (transportation, loading and unloading, etc.), and which makes possible at the same time a low-resistance flow about the intake during carried flight and boost flight.

According to the invention, an air intake for air-breathing engines for supersonic flight velocity, especially ram jet engines and ram rocket engines of missiles is provided with an essentially rectangular intake contour. The air intake has a boundary layer air discharge channel, it has an inner closing flap covering the intake contour, and has an actuating mechanism for opening the closing flap. The closing flap has a one-piece design and is adapted to the intake contour such that it completely covers the air intake in its closed position such that all peripheral scarved front edges are covered and are protected against erosion, the penetration of foreign bodies and deformation as a result.

To open the closing flap, the actuating mechanism preferably has a guide ramp, at which the edge of the closing flap, that is the rear edge when viewed in the direction of flow, can slide into its open position.

The actuating mechanism preferably has a locking means, which holds the closing flap in its closed position. The locking means has a locking bar connected to a cylinder that can be actuated pyrotechnically.

The actuating mechanism preferably has at least one tension spring pretensioning the closing flap in the direction of its open position.

The actuating mechanism may have a damping system controlling the course of the opening of the closing flap over time.

The edge of the closing flap that is the front edge when viewed in the direction of flow may be connected to a leaf spring system, which tensions the closing flap in the direction of coming into contact with the intake contour. The leaf spring system is connected to a slide, which is arranged on the top side and on the inner side of the air intake, is mounted displaceably in the longitudinal direction, closes the boundary layer air discharge channel in the closed position of the closing flap, and releases the boundary layer air discharge channel in the open position of the closing flap. The slide is connected to a tension spring, which tensions it with a pretension in the direction of its position in which it releases the boundary layer air discharge channel.

A first locking means may be provided in which the closing flap is locked during the opening of the air intake before its rear edge has reached its end position. This first locking means may be provided on the inner side of the air intake in the vicinity of the front edge of the closing flap.

The two lateral side flanks of the closing flap located opposite each other are preferably provided with sealing lips.

The closing flap designed according to the present invention along with its actuating mechanism not only offers a complete coverage of the inlet cross section and of the front edges of the intake and consequently a very extensive protection against erosion, especially during the carried flight, but also coverage of the boundary layer discharge channel usually provided in the air intake, as long as the engine is not ignited. During the handling of the air intake along with the corresponding engine on the ground, the closing flap stiffens the air intake to the extent that a high level of mechanical protection is achieved against denting and deformation. Furthermore, taking into account the intake geometry, the air drag is optimally reduced, because the closing flap joins the limiting geometry of the intake channel and the contour meeting the flow can be kept optimally flat.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
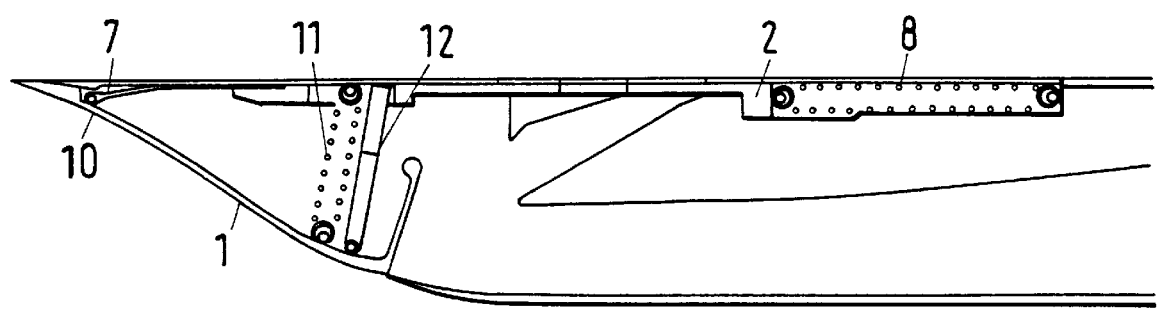
FIG. 1 is a vertical sectional view, in the longitudinal direction, through an air intake according to the present invention in the closed position of the closing flap.

Referring to the drawings in particular, in which identical parts are designated with the same reference numbers, the invention provides an air intake for an engine of a missile, which is used, e.g., to be carried by carrier airplanes and to be started during the flight. The air intake is to be closed both during its handling on the ground and during the flight until the start process in order to prevent foreign bodies, such as hail, stones, birds or water from penetrating and, on the other hand, to stiffen the air intake, which has a rectangular cross section in the exemplary embodiment shown, to the extent that it cannot be brought out of its basic shape and/or cannot be dented locally. At the same time, the scarved peripheral edges of the intake contour shall be protected in the direction of flight against any erosion during the carried flight by not being in an exposed position.

In the figures, reference number 1 designates the closing flap, which completely closes the intake contour, is adapted to it, covers the scarved front edges in its closed position, has a one-piece design, and is connected to an actuating mechanism.

A slide 2, which is arranged on the inside and in the longitudinal direction of the air intake and covers the boundary layer air discharge channel 3, is provided next to the closing flap 1.

Figure 2:
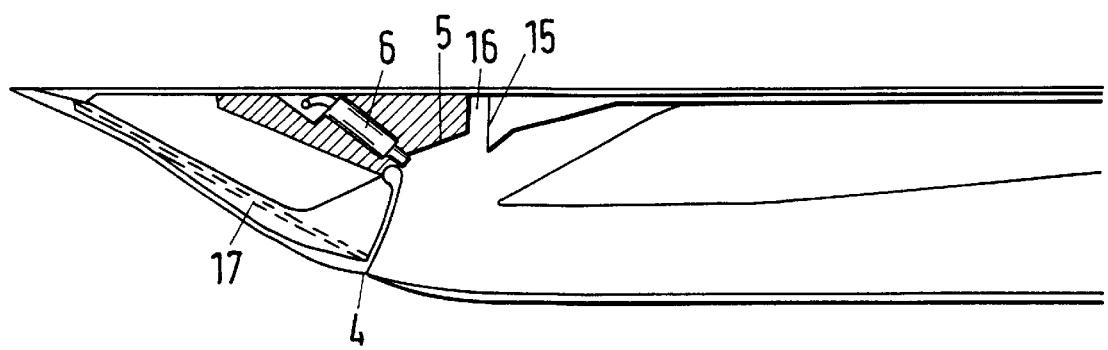
FIG. 2 is a parallel sectional view through the air intake according to FIG. 1.

As can be recognized from FIG. 2, the closing flap 1 is held by being in contact with the intake contour 4 as well as by being in contact with a guide ramp 5, wherein the latter is provided with a locking means 6, e.g., a locking bar provided with a cylinder that can be actuated pyrotechnically. In addition, the closing flap 1 is pressed onto the intake contour 4 of the intake channel by a leaf spring system 7 in its area that is its front area when viewed in the direction of flow. The leaf spring system 7 is connected to the slide 2.

In the position of the closing flap 1 shown in FIGS. 1 and 2, i.e., in which the air intake is consequently closed, the missile with the corresponding engine is carried on a carrier airplane for the use. The intake channel also remains closed during the phase of acceleration by the starting engine integrated within the missile. The closing flap now prevents the diffuser boom during the phase of acceleration and the penetration of foreign bodies into the air intake. The closing flap is arranged such that the scarved peripheral edges of the intake contour are not in an exposed position in the direction of flight, i.e., that the erosion affects only the closing flap during the carried flight.

Figure 3:
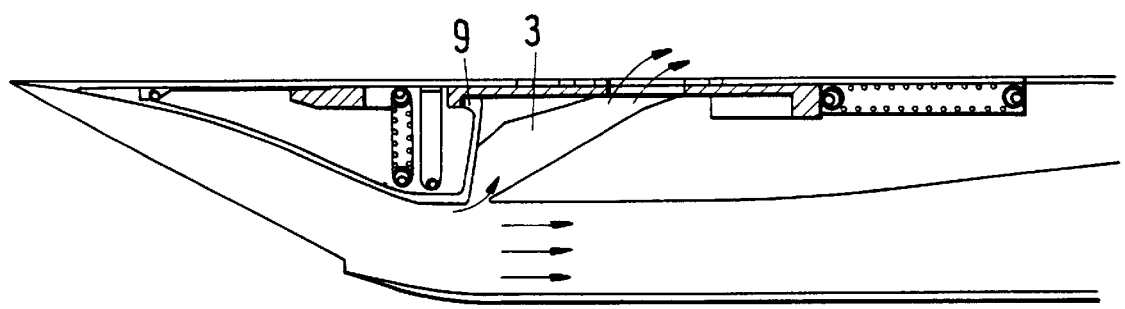
FIG. 3 is a vertical sectional view, in the longitudinal direction, through the air intake according to the present invention in the closed position of the closing flap.
Figure 4:
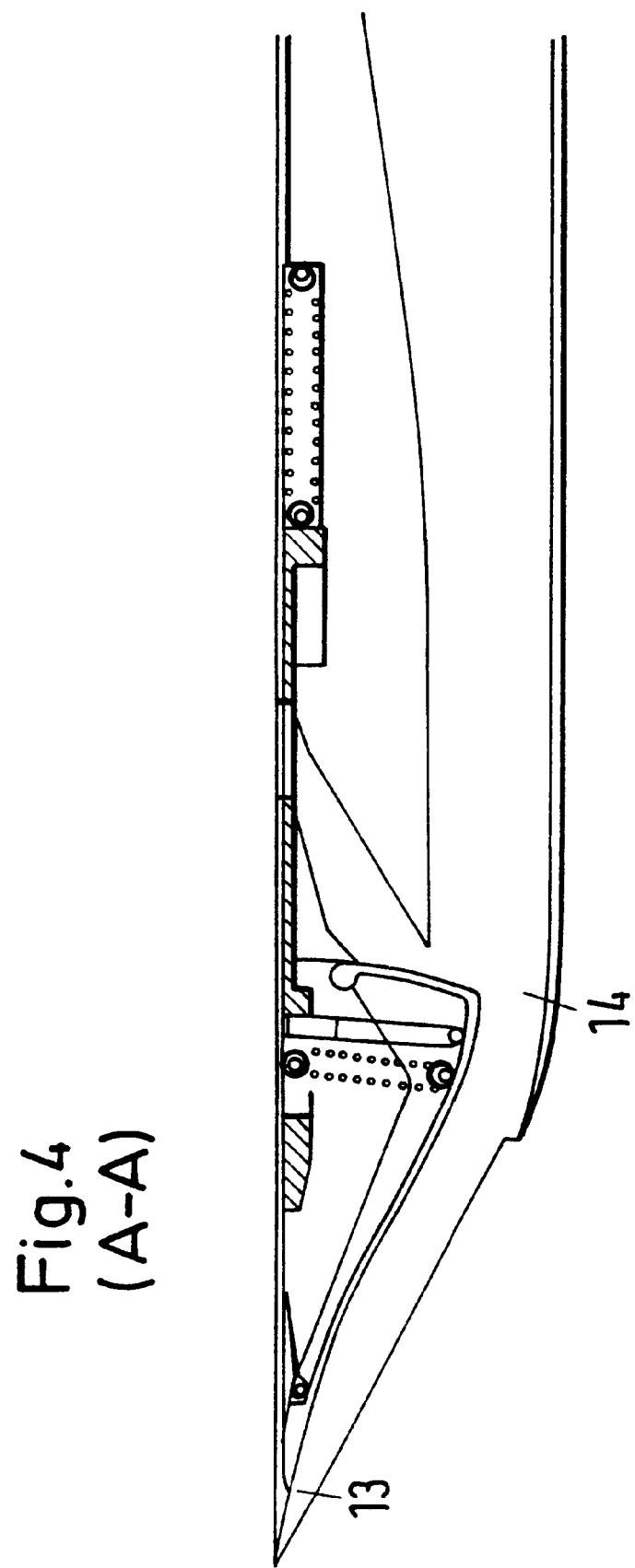
FIG. 4 is a vertical sectional view in the longitudinal direction through the air intake with the closing flap partially opened.
Figure 5:
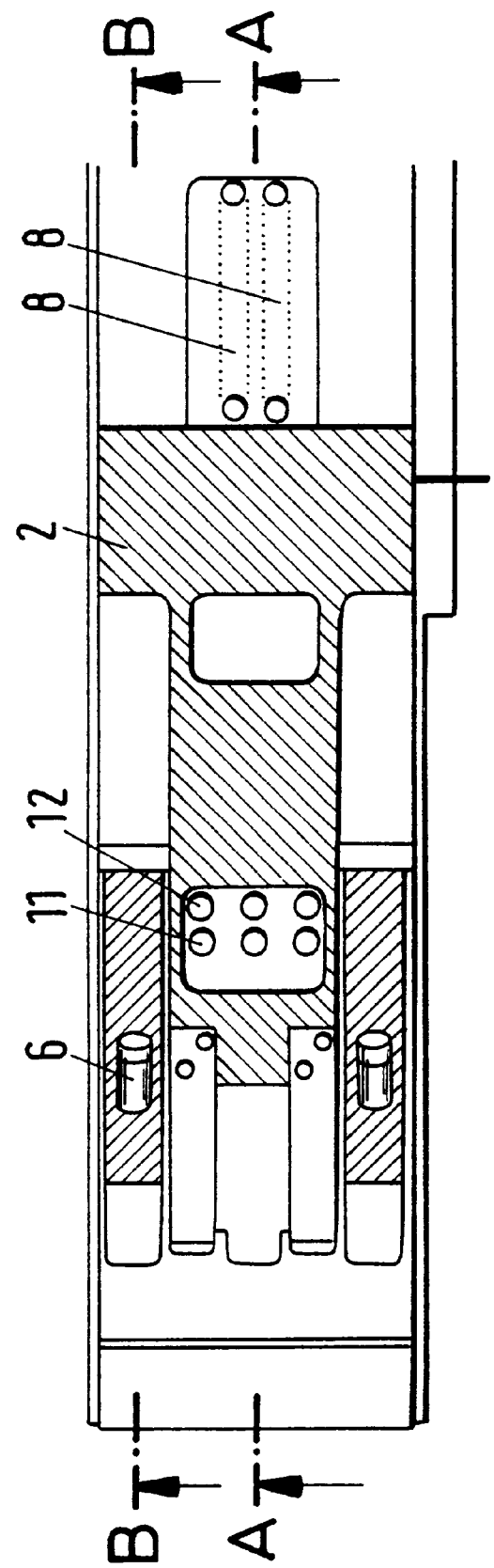
FIG. 5 is a horizontal sectional view, in the longitudinal direction, through the air intake according to the present invention.

The intake geometry in the operating position according to FIG. 3, in which the closing flap is shown in its opened position, is permanently given, and a partial area of the inner contour can be converted to function as a closing flap. It was possible to make the angle of attack of the closing flap an optimally flat angle in the exemplary embodiment selected, so that the aerodynamic resistance is extremely low as a result.

The engine is put into operation after the end of the phase of acceleration, e.g., at a velocity of $\geq$Ma 2, while the closing flap 1 for the air intake must assume its open operating position shown in FIG. 3 within a few ms.

By activating the locking means 6, the slide 2 pretensioned by tension springs 8 is released and, supported by the air forces acting on the closing flap 1, it tensions the closing flap in the direction of its open position designated by 9, while the edge of the closing flap 1 that is the rear edge when viewed in the direction of flow slides along the guide ramp 5. The slide 2 guided in grooves is connected to the closing flap 1 at the point 10 via the leaf spring system 7. In the exemplary embodiment shown, the displacement of the closing flap 1 is also supported by tension springs 11, and a damping piston system 12 is provided to make it possible to influence the course of the process over time.

To be in agreement with the structural design of the air intake, the guide ramp 5 is advantageously dimensioned such that the front contour 13 of the closing flap 1 already assumes its open position and is locked in a first locking means when the air channel 14 is opened only partially. The rear edge of the closing flap 1 slides along the guide ramp 5 up to a counterlimitation 15 and is fixed in a groove 16 in the longitudinal direction and is fixed in a second locking means.

The closing flap 1 additionally has a sealing lip system 17 at its lateral flanks. As is shown in FIG. 3, the closing flap 1 is fixed by the leaf spring system 7 in conjunction with the slide 2, on the one hand, and, on the other hand, by the tension springs 11 and a locking mechanism, not shown, which is arranged at the lateral flanks of the closing flap.

While a specific embodiment of the invention has been shown and described in detail to illustrate the application of the principles of the invention, it will be understood that the invention may be embodied otherwise without departing from such principles.

What is claimed is:

1. An air intake for air-breathing engines for supersonic flight velocity, especially ramjet engines and ram rocket engines of missiles, the air intake comprising:

an essentially rectangular intake contour, with a boundary layer air discharge channel;

an inner closing flap covering an air intake opening of said intake contour; and an actuating mechanism for opening the closing flap, said closing flap having a one-piece design and being adapted to the intake contour such that it completely covers the air intake opening in a closed position such that all peripheral scarved front edges are covered and are protected against erosion, the penetration of foreign bodies and deformation as a result, said actuating mechanism having a guide ramp to open the closing flap, at which guide ramp an edge of the closing flap that is the rear edge when viewed in the direction of flow can slide into its open position, and it has a locking means, which holds the closing flap in its closed position.

2. The air intake in accordance with claim 1, wherein said locking means has a locking bar connected to a cylinder that can be actuated pyrotechnically.

3. The air intake in accordance with claim 1, wherein said actuating mechanism has at least one tension spring pretensioning the closing flap in the direction of its open position.

4. The air intake in accordance with claim 1, wherein said actuating mechanism has a damping system controlling the course of the opening of the closing flap over time.

5. The air intake in accordance with claim 1, wherein two lateral side flanks of the closing flap located opposite each other are provided with sealing lips.

6. An air intake for air-breathing engines for supersonic flight velocity, especially ram jet engines and ram rocket engines of missiles, the air intake comprising:

an essentially rectangular intake contour, with a boundary layer air discharge channel;

an inner closing flap covering an air intake opening of said intake contour; and an actuating mechanism for opening the closing flap, said closing flap having a one-piece design and being adapted to the intake contour such that it completely covers the air intake opening in a closed position such that all peripheral scarved front edges are covered and are protected against erosion, the penetration of foreign bodies and deformation as a result, wherein an edge of the closing flap that is the front edge when viewed in the direction of flow is connected to a leaf spring system, which tensions the closing flap in the direction of coming into contact with the intake contour.

7. The air intake in accordance with claim 6, wherein said leaf spring system is connected to a slide, which is arranged on the top side and on the inner side of the air intake, is mounted displaceably in the longitudinal direction, closes the boundary layer air discharge channel in the closed position of the closing flap, and releases the boundary layer air discharge channel in the open position of the closing flap.

8. The air intake in accordance with claim 7, wherein said slide is connected to a tension spring, which tensions it with a pretension in the direction of its position in which it releases the boundary layer air discharge channel.

9. An air intake for air-breathing engines for supersonic flight velocity, especially ram jet engines and ram rocket engines of missiles, the air intake comprising:

an essentially rectangular intake contour, with a boundary layer air discharge channel;

an inner closing flap covering an air intake opening of said intake contour;

an actuating mechanism for opening the closing flap, said closing flap having a one-piece design and being adapted to the intake contour such that it completely covers the air intake opening in a closed position such that all peripheral scarved front edges are covered and are protected against erosion, the penetration of foreign bodies and deformation as a result; and a first locking means, in which the closing flap is locked during the opening of the air intake before a rear edge has reached its end position, is provided on the inner side of the air intake in the vicinity of the front edge of the closing flap.

10. The air intake in accordance with claim 9, wherein said first locking means locks the front edge of said closing flap in a position which is downstream and inwardly of its closed position.

11. A missile/aircraft air intake for air-breathing engines of an aircraft or missile, comprising:

an essentially rectangular intake contour, with a boundary layer air discharge channel;

an inner closing flap covering an air intake opening of said intake contour, said closing flap being a single piece adapted to the intake contour such that it completely covers the air intake opening in a closed position such that all peripheral scarved front edges are covered and are protected against erosion, the penetration of foreign bodies and deformation as a result; and an actuating mechanism for opening the closing flap by moving said closing flap from said closed position into an open position, in which an edge of said closing flap that is the front edge when viewed in the direction of flow is downstream and inwardly of its closed position.

12. The air intake in accordance with claim 11, wherein said actuating mechanism has a guide ramp to open the closing flap, at which guide ramp an edge of the closing flap that is the rear edge when viewed in the direction of flow can slide into its open position, and it has a locking means, which holds the closing flap in its closed position.

13. The air intake in accordance with claim 12, wherein said locking means has a locking bar connected to a cylinder that can be actuated pyrotechnically.

14. The air intake in accordance with claim 11, wherein said actuating mechanism has at least one tension spring pretensioning the closing flap in the direction of its open position.

15. The air intake in accordance with claim 11, wherein said actuating mechanism has a damping system controlling the course of the opening of the closing flap over time.

16. The air intake in accordance with claim 11, wherein an edge of the closing flap that is the front edge when viewed in the direction of flow is connected to a leaf spring system, which tensions the closing flap in the direction of coming into contact with the intake contour.

17. The air intake in accordance with claim 16, wherein said leaf spring system is connected to a slide, which is arranged on the top side and on the inner side of the air intake, is mounted displaceably in the longitudinal direction, closes the boundary layer air discharge channel in the closed position of the closing flap, and releases the boundary layer air discharge channel in the open position of the closing flap.

18. The air intake in accordance with claim 17, wherein said slide is connected to a tension spring, which tensions it with a pretension in the direction of its position in which it releases the boundary layer air discharge channel.

19. The air intake in accordance with claim 11, wherein a first locking means, in which the closing flap is locked during the opening of the air intake before a rear edge has reached its end position, is provided on the inner side of the air intake in the vicinity of the front edge of the closing flap.

20. The air intake in accordance with claim 11, wherein two lateral side flanks of the closing flap located opposite each other are provided with sealing lips.

\* \* \* \* \*